(12) United States Patent
Menguy

(10) Patent No.: US 8,701,116 B2
(45) Date of Patent: Apr. 15, 2014

(54) METHOD FOR MANAGING THE SHARED RESOURCES OF A COMPUTER SYSTEM, A MODULE FOR SUPERVISING THE IMPLEMENTATION OF SAME AND A COMPUTER SYSTEM HAVING ONE SUCH MODULE

(75) Inventor: Thomas Menguy, Valbonne (FR)

(73) Assignee: Alcatel Lucent, Paris (FR)

( * ) Notice: Subject to any disclaimer, the term of this patent is extended or adjusted under 35 U.S.C. 154(b) by 655 days.

(21) Appl. No.: 12/669,144

(22) PCT Filed: Jul. 17, 2008

(86) PCT No.: PCT/FR2008/051349
§ 371 (c)(1),
(2), (4) Date: Oct. 14, 2010

(87) PCT Pub. No.: WO2009/013437
PCT Pub. Date: Jan. 29, 2009

(65) Prior Publication Data
US 2011/0055840 A1 Mar. 3, 2011

(30) Foreign Application Priority Data
Jul. 17, 2007 (FR) ...................................... 07 05155

(51) Int. Cl.
*G06F 9/46* (2006.01)
(52) U.S. Cl.
USPC ........................................................ 718/103
(58) Field of Classification Search
USPC ........................................................ 718/103
See application file for complete search history.

(56) References Cited

U.S. PATENT DOCUMENTS

| | | | |
|---|---|---|---|
| 6,073,132 A * | 6/2000 | Gehman | ............................... 1/1 |
| 6,105,098 A | 8/2000 | Ninose et al. | |
| 6,738,974 B1 | 5/2004 | Nageswaran et al. | |
| 6,745,221 B1 | 6/2004 | Ronca | |
| 6,947,048 B2 | 9/2005 | Dawson | |
| 7,346,910 B1 * | 3/2008 | Ahern et al. | .................. 719/314 |
| 2004/0153545 A1 | 8/2004 | Pandya et al. | |
| 2006/0064658 A1 | 3/2006 | Minonne et al. | |
| 2006/0161768 A1 | 7/2006 | Baissus et al. | |
| 2007/0057044 A1 * | 3/2007 | Uchiyama et al. | ............ 235/380 |

FOREIGN PATENT DOCUMENTS

CN 1622075 6/2005

\* cited by examiner

*Primary Examiner* — Mengyao Zhe
(74) *Attorney, Agent, or Firm* — Harness, Dickey & Pierce

(57) ABSTRACT

The disclosure aims to solve the general problem of managing the system with multiple resources of different types. In particular, the disclosure is intended for the sharing of resources between multiple applications that can be executed on a computer platform for situations involving the addition of new resources that were not initially provided in order to achieve these objectives, conflicts are avoided between shared resources starting at the application, with access rights being allocated for each application, while an opening is maintained for the addition of new applications and resources. More specifically, according to this method for managing the resources of a computer system, that are shared between multiple applications, allocation rules are provided during the execution of the applications and the rules generate access rights for each application in relation to each shared resource in the form of successive steps. The steps are controlled for each shared resource by a specific control module and, with each command, a decision criteria module parameterization step checks the rule for allocating access rights, whereby the decision criteria can be shared between at least parts of the control modules.

5 Claims, 2 Drawing Sheets

METHOD FOR MANAGING THE SHARED RESOURCES OF A COMPUTER SYSTEM, A MODULE FOR SUPERVISING THE IMPLEMENTATION OF SAME AND A COMPUTER SYSTEM HAVING ONE SUCH MODULE

CROSS-REFERENCE TO RELATED APPLICATIONS

This application is a National Phase Entry of International Application No. PCT/FR2008/051349, filed on Jul. 17, 2008, which claims priority to French application Ser. No. 07/05155, filed on Jul. 17, 2007, both of which are incorporated by reference herein.

BACKGROUND AND SUMMARY

The invention relates to a method for managing resources of a computer system, such resources also being shared between several different application execution modules for example the remote processing of data, the logistics for controlling servo-controlled systems, controlling failures, controlling inventories, etc. The invention also relates to a module supervising the implementation of such method and the computer system including such supervising module.

In a computer system, a platform, a computer or a terminal, independent applications can be executed by accessing software and hardware resources common to the computer system. The sharing of such resources such as a screen, inlets/outlets, memory, sound processor, access to a network or any other resource, between the applications, maybe a problem. Besides, when adding applications, the implementation functionalities of which use such software and hardware resources between several execution modules, the arbitration for the acquisition or sharing of such resources is particularly difficult to implement when the number of different types of resources increases.

In a particular case, the U.S. Pat. No. 6,947,048 discloses a method for managing access to a screen in an integrated system, consisting in centralizing the screen accesses to allocate rights of access to several applications. This solution is however limited to graphical display management. The U.S. Pat. No. 6,882,965 relating to a method for the hierarchic scheduling of access to the resources is also known. But this solution is limited to temporal decision criteria.

In addition, the Chinese Patent No. 1622075 discloses a system for allocating shared resources consisting in a set of independent resources managers ad hoc for each type of resource. Each resource, in this solution, is independent. Thus, the allocation decision criteria are also independent and it is impossible to obtain uniformity in the management of resources. Thus, in spite of the improvements made, none of these documents could give a solution to the difficulty of managing shared resources such as for example, when two applications simultaneously make requests for access to the same resource, as this is frequently the case for the sound channel.

In order to limit this type of conflict, it is known to use solutions specific to a group of resources, for example through a connection between the graphical display management and the management of the keyboard. Thus, the architectures based on the usual interfaces X11 or Win32 adopt this type of solution. Such a solution is for example available on the site http://www.x.org/ for X11, and on the site http://msdn2.microsoft.com/en-us/library/aa383750.aspx for Win32. However, in these solutions, nothing can prevent conflicts for obtaining other resources such as sound. A fortiori, such solutions do not make it possible to avoid conflicts for the access to non provided or non managed resources.

Another known solution consists in modelizing the whole system, with all the applications and all the resources managements using a machine stating the trace of the connections provided with appropriate tools. This solution however is not adapted to enable the addition of an initially non provided service, since this questions the initial model. Thus, in spite of the improvements made in these specific cases, such solutions do not solve the problem mentioned in the most common case of shared resources, particularly when the number of resource types is increased in a limited technical environment, the processing capacities of which are thus reduced with respect to the multiplication of applications.

The invention aims at solving in a coherent way the general problem of managing a system of multiple resources having a different nature. More particularly, the invention is intended for the sharing of resources between multiple applications that can be executed on a computer platform or in situations involving the addition of new resources that were not initially provided. In order to achieve these objectives, the invention provides to avoid conflict between shared resources starting from the application, with the access rights being allocated for each application while maintaining an opening enabling the addition of new applications and resources. More specifically, the object of the invention is a method for managing the resources of a computer system that are shared between multiple applications, wherein during the execution of such applications, allocation rules generate, for each application, access rights to each shared resource in the form of successive steps controlled, for each shared resource, by a specific control module. With each command, a decision criteria parameterization step checks the rule for allocating access rights, whereby the decision criteria can be shared between at least part of the control modules, with a control module and at least one decision criterion being added to the system when a new resource is added to the system.

According to particular embodiments:

the decision criteria parameterization can be executed by application sorters based on access priority properties;

the priority properties allocated to the applications corresponding with the decision criteria refer to the activation of one application, when one sorted application is placed in front of the applications having the same application priority, under those having a higher application priority, to cooperative abort, when one application is sorted and placed under the application having the same application priority, but above those having a lower application priority, and to the deactivation when the application is placed in a non-sorted list of deactivated applications, with the sorting being reserved for a main list of applications;

steps for actuating decision criteria are provided when modifications are made on at least one of those;

the steps for allocating access rights consists in authorizing the exclusive access, denying access, authorizing shared access or partial access to a resource by an application;

a control module and at least a decision criterion can be added more particularly when a new resource is added to the computer system.

Advantageously, the method enables a formalization, flexibility and simplification of the management of a device (whether mobile or not), by allowing the adaptation thereof as a function of the existing or future resources, and to change the behavior of access and sharing of software and hardware resources, without affecting the high level functions of the system. In addition, the method according to the invention does not require a particular computer identification of the management of applications, but any known identification in the computer systems of the prior art. The invention also relates to a manager of the resources to be shared between the applications, also called a supervising module, intended for the implementation of the method.

According to the invention, this computer system shared resource management supervising module including an application space and hardware and software resources is composed of first series of interdependent decision criteria implementation complements and a second series of resource access control components having multiple connections with the first series. Thus, requests for utilizing resources and requests for access to the resources respectively transmitted by specific connections of the application space, to the decision criteria components and resource access control components, are processed by the components of the supervising module to share the resources. In particular embodiments, the decision criteria and access control implementation components can be storage memories connected with adapted software modules. The invention also relates to a computer system including such a supervising module, the decision criteria and resource access control implementation components of which are configured through a parameterization and distribution of links interconnecting these. Such parameterization can, for example, be in the form of priority properties corresponding to the decision criteria allocated to each application of the application space of the system.

BRIEF DESCRIPTION OF DRAWINGS

Other characteristics and advantages of the invention will appear when reading the following detailed exemplary embodiment, while referring to the appended drawings which respectively show.

DETAILED DESCRIPTION

Figure 1:
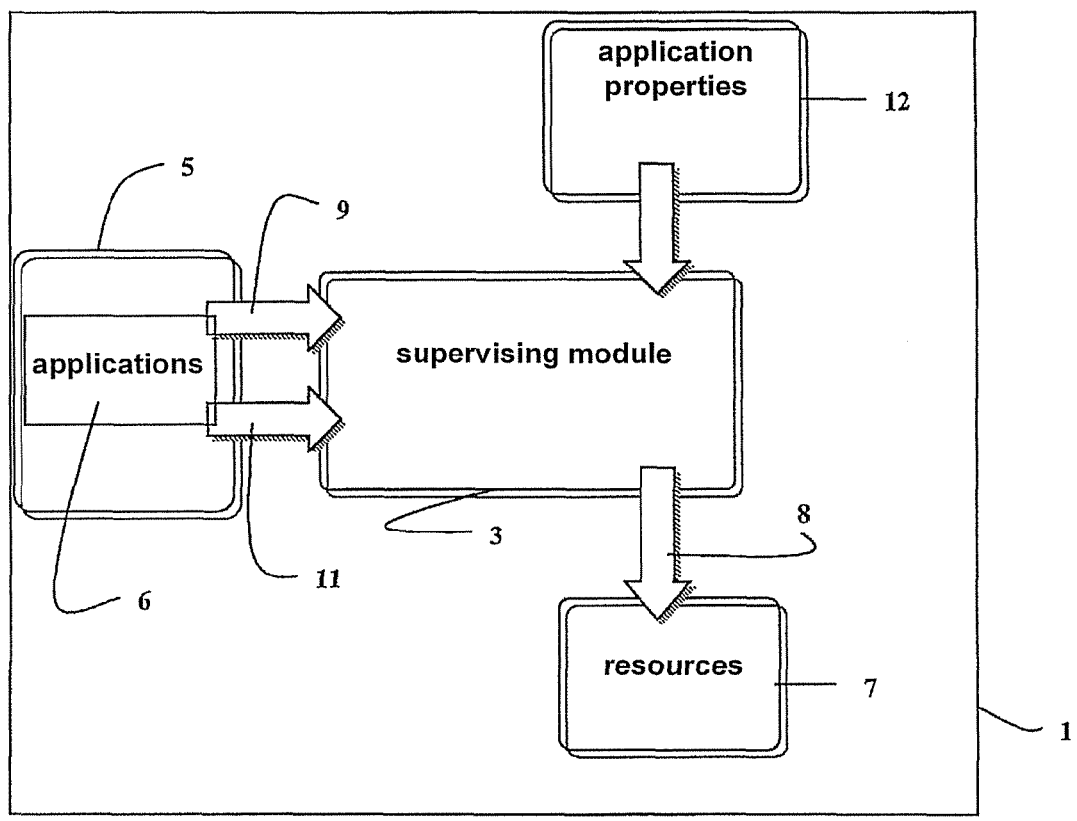
FIG. 1, a synthetic view of a computer system according to the invention.

FIG. 1 synthetically shows a computer system 1 according to the invention, including a supervising module 3, the application space 5 of the system applications and the resources 7 to be shared between the applications and implemented by the system. The supervisor 3 receives from the application space 5 requests 9 for access to resources and modification of access, as well as the identification of the applications in the abstract mode by identifiers 11. As a function of the properties 12 of the space 5 applications describing their respective access rights to the resources 7, the supervisor 3 allocates or not a resource 7 as explained hereinunder while referring to FIG. 2. Access 8 of the applications to the resources 7 is managed in the abstract mode by the identifiers 11.

Figure 2:
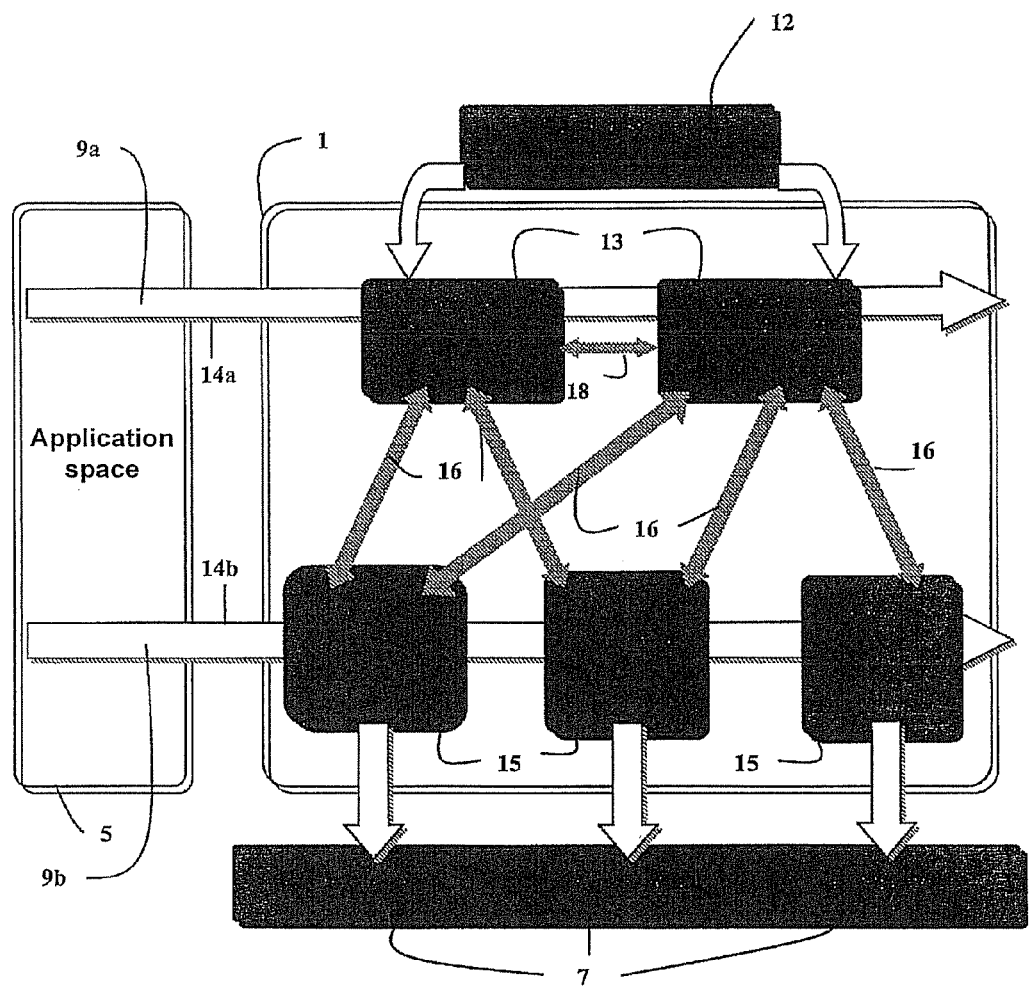
FIG. 2, a detailed view of the previous system making it possible to illustrate the operation of the supervising module.

The supervising module 3 and the peripheral devices of the system are detailed more concretely and more precisely hereinunder, while referring to FIG. 2. The supervising module 3 receives, from the application space 5, as requests 9 (FIG. 1), requests 9a for using resources 7 and requests 9b for accessing such resources. The supervisor 3 routes (arrow 14a) the requests 9a for utilization of the resources 7 to decision criteria modules or components 13, and connects (arrow 14b) the requests 9b for access to the resources 7 of the application space 5 with resources 7 access control modules or components 15. In the exemplary embodiment, such components are storage memories related with suitable software modules known to the persons skilled in the art.

The supervisor 3 stores, makes a list of, and initializes on the one hand the components 13 implementing the decision criteria and, on the other hand, the components 15 implementing the resources 7 control specific to each type of resource. Advantageously, the supervisor can create, modify or delete the associations, also called registrations, between the decision criteria components 13 and each resource 7 control component 16. Such registrations are shown by double arrows 16 in FIG. 2, and the resource controls can be registered with the decision criteria or vice versa. The supervisor can also enable a decision criterion to register with other decision criteria, and these registrations are shown by arrows 18.

Here the identifiers 11 (FIG. 1) are handles which give digital values to the applications 5. Such handles create or cancel access by making the corresponding acquisition of resource abstract. The management of the handles 11 is also obtained by the creation or association of handles with resource control components 15, notification or suppression of such handles.

Each decision criterion is considered as a computer component offering services applicable to applications 5 or other computer objects such as the handles 11. A decision criterion is associated with one of several resource control components through the registrations 16. It registers with the supervisor to be able to provide services and can be added to or removed from the system at any time. A decision criterion supplies request services for the objects it handles, standardized registration services, access controls to a resource which will make the decisions thereof based on the decision criterion or criteria with which they registered.

In one exemplary embodiment, the decision criterion is an application sorter. Such sorter is based on a priority property of the applications, hereinafter the "application property". According to such property, the sorter keeps an ordered descending list of the applications as a function of their priority, and also of the requests transmitted such that:

the activation of an application, when one sorted application and placed in front of the applications having the same application priority, but under those having a higher application priority;

the cooperative abort, when an application is sorted and placed under the applications having the same application priority, but above those having a lower application priority;

the deactivation, when the application is placed in a non sorted list of deactivated applications, with the sorting being reserved to a main list of applications.

The application sorter can advantageously provide a registration service through the supervisor to make it possible for decision or resource control criteria to be informed of a modification in the sorting of the applications for such decision criterion. According to another example, the decision criterion is a handle sorter: it is based on another priority property of the applications also called "application priority to another resource", specific to each resource.

Similarly to the application sorter, the handle sorter keeps an ordered descending list for each resource, of the applications handles as a function of their priority of application to a resource, and also of the requests transmitted to the handles such that:

the activation of a handle, when the handle is sorted and placed in front of the handles having the same priority of application to a resource, but under those having a higher priority of application to a resource;

the cooperative abort, when the handle is sorted and placed under the handles having the same priority of application to a resource, but above those having a lower priority of application to a resource;

the deactivation, when the handle is no longer sorted in the main list and is placed in another non sorted list of deactivated handles.

In addition, this sorter enables the activation or deactivation of the "glue" mode: if this mode is activated on the given handle and if the sorter is activated for such handle then the handle will not change position if one of the previous requests is made thereon. The handle sorter is further registered with the application sorter and when it is notified of a change in an application, it removes the application handles accordingly by applying them the above-mentioned requests. The application sorter can then advantageously provide a registration service through a supervisor to enable other decision criteria or resource control components to be informed of a change in the sorting of the handles associated with the resource managed by the resource control component. Preferably, the handle sorter also provides high level requests to know, for a given application and a given resource, what are the applications which could prevent it from obtaining the utilization of its resource.

In operation, a decision criteria component 13 thus defines rules for allocating rights, as a function of the priority properties such as those described above and defining the rights of the applications 5. The resource control component 15 then makes the decision to give or not to give a resource 7 to an application 5 as a function of the decision criteria for which it has registered. It has the highest power as for the acquisition of rights and it can manage one or several resources 7. A resource control is registered with the supervisor to be able to use the services thereof, and can be added to or removed from a system at any time. Then it provides no service through the supervisor, but offers suitable services to the rest of the system so that the latter can have the condition of acquisition of a resource, the screen or the keyboard when ins, as in the example, a computer.

The invention is not limited to the exemplary embodiments described and shown above. In addition to both decision criteria, the application sorter and the handle sorter, other decision criteria can be implemented, for example, decision criteria depending on the processor load, the available memory space, the right of access and the battery level. In addition, other types of priority properties of the applications can be defined as a function of the nature of such applications for example, the mention of the occupation of the dynamic memory, static memory or authorization levels related to security: rights of access to a particular resource, for example, or an identification key.

The invention claimed is:

1. A method for managing resources of a computer system shared between a plurality of applications, the method comprising:

during the execution of such applications, allocation rules generate, for each application, rights of access to each shared resource in the form of successive sequenced steps controlled, for each shared and added resource, by a specific control module, and in that with each command a decision criteria module parameterization step checks the rules for allocating access rights, wherein the decision criteria can be shared between at least part of the control modules, wherein the decision criteria parameterization step is executed based on access priority properties allocated to the plurality of applications, wherein each of the decision criteria is an application sorter, and wherein, for each application sorter, when the application sorter sorts a first application, from among the plurality of applications, by placing the first application in front of applications having a same application priority as the first application and under applications having a higher application priority than the first application, the priority properties allocated to the first application indicate that the application is to be activated, when the application sorter sorts the first application by placing the first application under the applications having the same application priority as the first application and above applications having a lower application priority than the first application, the priority properties allocated to the first application indicate that the first application is to be cooperatively aborted, and when the application sorter sorts the first application by placing the first application in a non-sorted list of deactivated applications, the priority properties allocated to the first application indicate that the first application is to be deactivated.

2. A method for managing resources according to claim 1, wherein the rules for allocating access rights include at least one of the following: (a) authorizing exclusive access, (b) denying access, and (c) authorizing the shared access or the partial access to a resource by one application.

3. A method for managing results according to claim 1, in which sorting of handles is submitted to the sorting of applications.

4. A method for managing resources according to claim 1, wherein steps of actuating the decision criteria are scheduled when modifications are made to at least one of these.

5. A supervising module implemented by a computing system and configured to supervise the management of shared resources of the computer system, the module comprising:

an application space, a first series of components allowing the implementation of inter related decision criteria, the first series of components being one or more first storage memories, and a second series of components allowing controlling access to the resources in multiple connections with the first series, the second series of components being one or more storage second memories, the supervising module being configured such that requests for utilizing resources and requests for access to the resources are respectively transmitted through specific connections from the application space to the decision criteria components and to the resources access control components, thus being treated by the components of the supervising module to share the resources, the resources including hardware resources, and the supervising module being configured such that at least one new decision criteria component is added to the module when a new resource is added to the computer system, wherein the decision criteria implementation and resource access control components of which are configured through parameterization and distribution of the links created between these, priority properties corresponding to the decision criteria being allocated to each application of the applications space of the computer system, wherein the decision criteria parameterization step is executed based on access priority properties allocated to the plurality of applications, wherein each of the decision criteria is an application sorter, and wherein, the supervising module is configured such that, for each application sorter, when the application sorter sorts a first application, from among the plurality of applications, by placing the first application in front of applications having a same application priority as the first application and under applications having a higher application priority than the first application, the priority properties allocated to the first application indicate that the application is to be activated, when the application sorter sorts the first application by placing the first application under the applications having the same application priority as the first application and above applications having a lower application priority than the first application, the priority properties allocated to the first application indicate that the first application is to be cooperatively aborted, and when the application sorter sorts the first application by placing the first application in a non-sorted list of deactivated applications, the priority properties allocated to the first application indicate that the first application is to be deactivated.

* * * * *